(No Model.)

N. H. & T. C. DAVIS.
CAR SPRING.

No. 488,754.  Patented Dec. 27, 1892.

WITNESSES:

INVENTORS
Nathan H. Davis.
BY Thomas C. Davis.
ATTORNEY.

UNITED STATES PATENT OFFICE.

NATHAN H. DAVIS AND THOMAS C. DAVIS, OF PHILADELPHIA, PENNSYLVANIA.

CAR-SPRING.

SPECIFICATION forming part of Letters Patent No. 488,754, dated December 27, 1892.

Application filed October 12, 1891. Serial No. 408,437. (No model.)

*To all whom it may concern:*

Be it known that we, NATHAN H. DAVIS and THOMAS C. DAVIS, citizens of the United States, both residing in the city and county of Philadelphia, State of Pennsylvania, have invented a new and useful Improvement in Car-Springs, which improvement is fully set forth in the following specification and accompanying drawings.

Our invention relates to improvements in car springs and consists of the construction of the plates thereof with beads which are struck up, stamped or otherwise pressed out of the metal of which the plates are formed, whereby provision is made for preventing lateral shifting of the springs whose ends are seated around said beads and thereby centered.

It also consists in providing the plates with guides for the ends of the springs, whereby the latter are prevented from bending in lateral direction.

Figure 1:
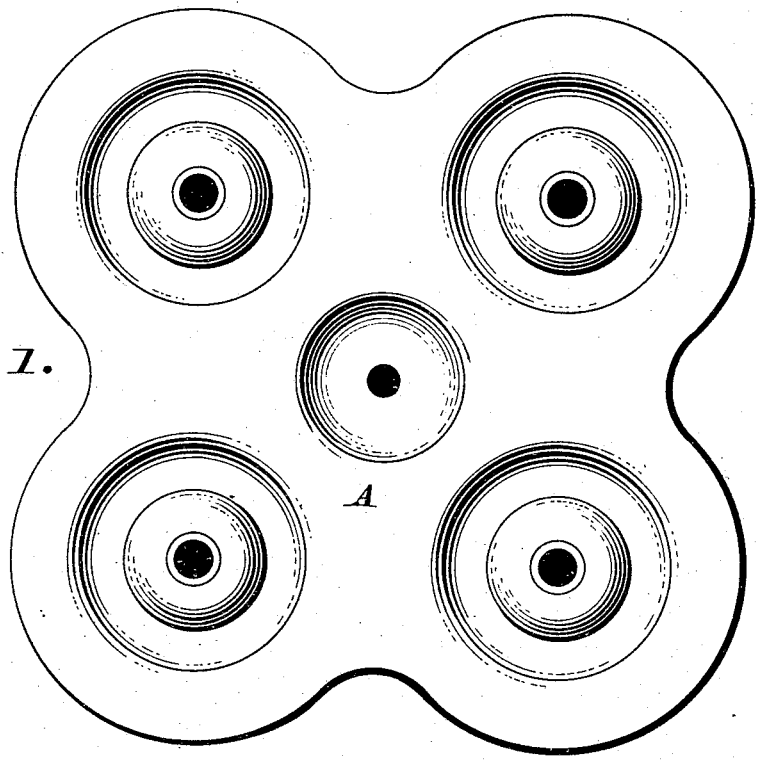
Figure 2:
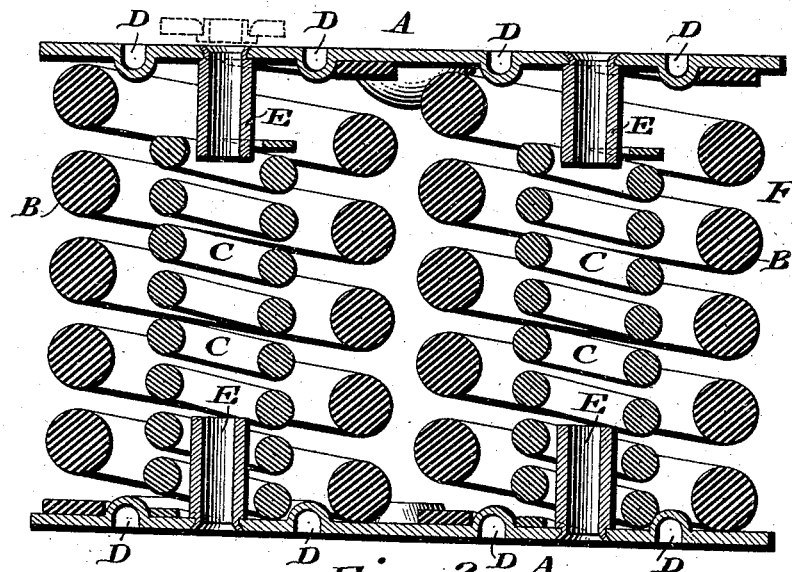
Figure 3:
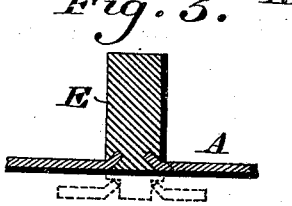

Figure 1 represents a plan view of a spring embodying our invention. Fig. 2 represents a vertical section thereof. Fig. 3 represents a vertical section of a portion of a modification.

Similar letters of reference indicate corresponding parts in the several figures.

Referring to the drawings:—A designates the upper and lower plates of a spring for a car or other vehicle to which it may be applied.

B and C designate the springs, the springs C being of less diameter than the springs B, and being inclosed therein, said springs C being also of the graduated order as well known. On the inner faces of the plates A are beads D, which are formed by striking-up, stamping, pressing, crimping or otherwise working the metal of which the plates are constructed, said beads being hollow and of annular form, and so disposed that when the springs are seated on the plates, the ends of the springs B encircle said beads, while the springs C are encircled by the same. By this provision the springs are retained in position and centered on the plates, they being thus held separated and prevented from shfting. The beads are hollow, as stated, whereby they crimp the metal plates and vastly strengthen the same. The construction of the several parts being hereinafter set forth.

E designates guides which are formed of short pieces of metal, either tubular or solid, the same being secured to the plates A on the inner faces thereof in such position as to project into or enter the ends of the graduated or inner springs C, without interfering with the freedom of action of said springs or the resiliency thereof, it being seen that when the car spring is in operation or loaded, as the guides enter the spring C to a greater or less extent, they serve to prevent the end portions thereof from bending or bulging, and thus said springs operate true and uniform. The guides are secured to the plates by shouldering the ends of said guides, forming openings in the plates, and fitting the ends of the guides in the openings of the plates. The ends of the guides are then swaged, whereby they are compressed against the walls of the openings of the plates, so as to connect the guides with the plates in a firm, secure and reliable manner.

Having thus described our invention, what we claim as new, and desire to secure by Letters Patent, is:—

1. A car spring plate having beads on one face thereof, and guides secured thereto, said parts being combined substantially as described.

2. A car spring plate having struck up beads on one face thereof, and guides secured thereto, said guides having shoulder ends inserted in openings in said plate and swaged thereto, said parts being combined substantially as described.

3. A car spring formed of two plates, each having beads on its inner face, tubular guides secured to said plates and projecting from said inner faces, springs embracing or guided on said beads, and inner graduated springs on said tubular guides, said parts being combined substantially as described.

NATHAN H. DAVIS.
THOMAS C. DAVIS.

Witnesses:
JOHN A. WIEDERSHEIM,
A. P. JENNINGS.